Sept. 14, 1948.  C. O. ROTHWEILER  2,449,252
PROFILING DEVICE
Filed May 8, 1945
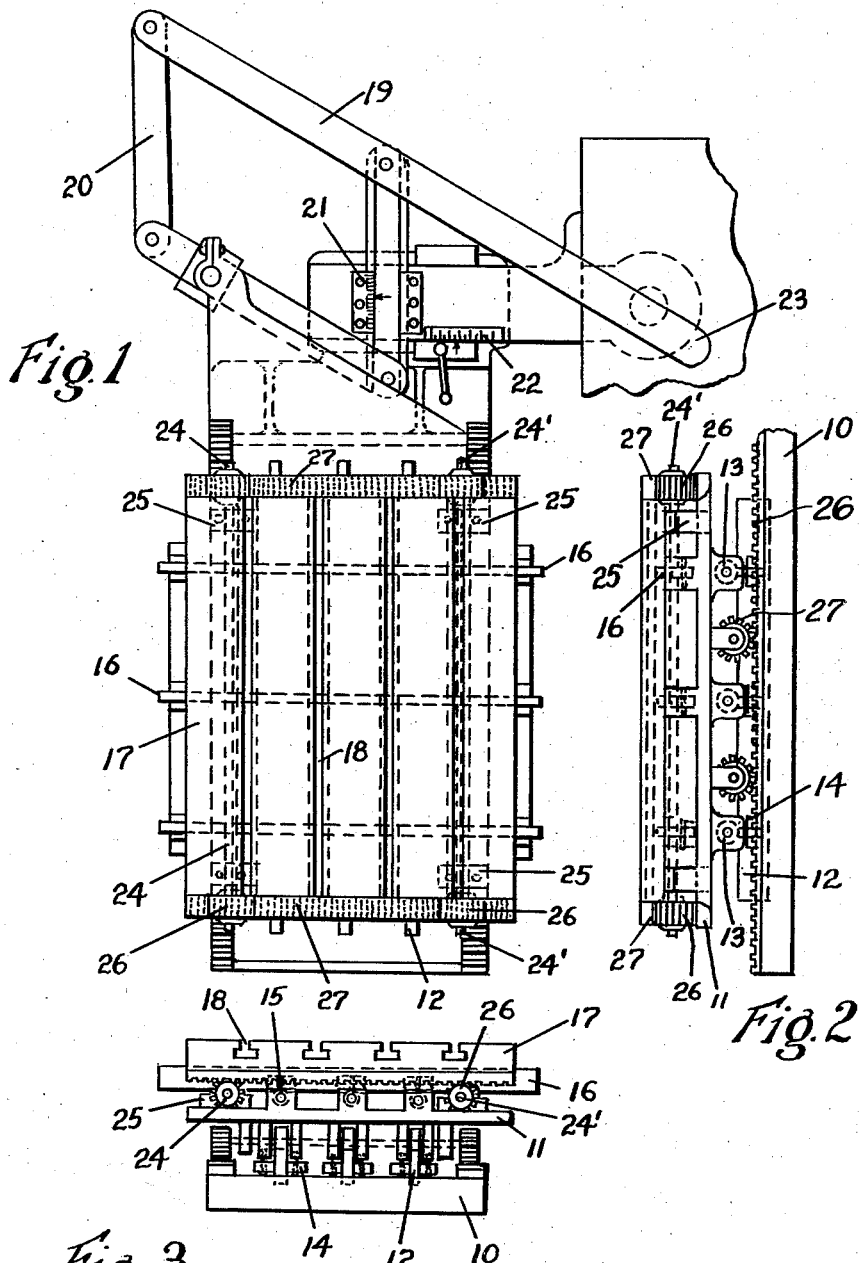
INVENTOR.
CHARLES O. ROTHWEILER
BY
Christian K. Nielsen
ATTORNEY.

Patented Sept. 14, 1948

2,449,252

UNITED STATES PATENT OFFICE 2,449,252

PROFILING DEVICE

Charles O. Rothweiler, Milwaukee, Wis.

Application May 8, 1945, Serial No. 592,661

3 Claims. (Cl. 90—13.1)

My invention relates to improvements in profiling devices, and more particularly to an improvement in a type of profiling device described, illustrated and claimed in my patent, Number 2,253,095, issued to me under date of August 19, 1941.

The object of my invention is to provide a stabilizing movement of adjustment of the table of a profiling device, that may be applied to any conventional type of milling machine or the like, without any mechanical changes in the construction of the machine, and a means of equalizing the movement of the profiler in either one or both directions.

Other objects of my invention will present themselves and become more apparent as the description proceeds, especially when reference is made to the accompanying drawings.

Figure 1 is a plan view of the pantograph arrangement of the device, illustrating the top of the movable table to which the workpiece is attached.

Figure 2 is a side view of the device, illustrating the manner in which the base, the auxiliary carriage and the table are adjustably mounted, and showing a gear rack and pinion arrangement for the stabilization of the movement of the table.

Figure 3 is a similar view of the end of the assembly of the base carriage and table.

Similar characters of reference indicate corresponding parts throughout the several views, and referring now to the same, the character 10 shows a base that may be attached to any conventional work table of a machine such as a milling machine. The device has an intermediate portion 11, referred to as an auxiliary carriage, which is slidably mounted to the base 10 and is guided by the rails 12 on the base 10, by means of horizontally mounted rollers 13 resting on the top of the rails 12 and vertically mounted rollers 14 contacting the sides of the rails 12. On the top of the auxiliary carriage 11, there is a similar arrangement of rollers 15 contacting rails 16 disposed in transverse relation to the rails 12 and mounted onto the bottom of the table top 17. This table top 17 is arranged with a plurality of grooves 18 for fastening the workpiece being fabricated. The arrangement of the base, auxiliary carriage and table top is in a manner to permit lateral and longitudinal movement of the table top 17. The lateral movement being acquired by contact of the roller assembly 15 on the bottom of the table top 17 with the top of the auxiliary carriage 11, while the longitudinal movement is acquired by the contact of the rollers 13 and 14 on the bottom of the auxiliary carriage 11 with the top of the base 10. The entire unit is actuated by the pantograph lever 19 connected to the device by the link member 20. The micrometer controlled adjustment of the table top being calibrated by means of the graduated scales 21 and 22, respectively. The end 23 of the pantograph lever 19 is employed for tracing and following the pattern and design being worked out.

In the lateral and longitudinal movement of the auxiliary carriage 11 and table top 17, there may at times be unequal pressure exerted in one direction or another, and to equalize and stabilize the movement, either laterally or longitudinally, I show shafts 24 and 24' mounted on bearings 25, which bearings are fastened to the upper face of the auxiliary carriage 11. The ends of the shafts 24 and 24' are provided with spur gears or pinions 26 which contact gear racks 27, shown mounted on the ends of the lower face on the table top 17. This construction assures equal movement of both ends of the table top 17, and a similar arrangement of pinions 26 and racks 27 can be employed between the auxiliary carriage 11 and the base 10 to insure equalized longitudinal movement of the device.

This gear and rack arrangement does not, in any way, interfere with the movement of the table top, but does very definitely provide an equalized movement.

In the chosen embodiments of my invention, I show a specific manner in which the movement can be equalized and stabilized. I fully realize that there are many changes that may be made in the general form and configuration of the arrangement, and changes might suggest themselves without interfering in any way with the spirit of the invention or the scope of the appendent claims.

Having thus described my invention, what I claim and desire to secure by Letters Patent in the United States is:

1. A device of the character described in combination with a pantograph, said device comprising a base, an auxiliary carriage, a table top, said auxiliary carriage disposed between said table top and base, said pantograph attached at one of its ends to said base and at the other of its ends to said table top, a plurality of ways attached to the top of said base, a plurality of ways attached to the bottom of said table, the ways on said table disposed in angular relation with the ways on said base, slidable means on said auxiliary carriage engaging said ways, thereby permitting said table to move in transverse relation to the movement of said auxiliary carriage on said base by means of said pantograph, means in the form of shafts journalled in bearings attached to the top of said base, said shafts provided with spur gears at their ends, gear racks disposed at the bottom of said auxiliary carriage, said gear racks engaging said spur gears to equalize and stabilize the movement of said auxiliary carriage in transverse relation with the ways disposed on the face of said base.

2. A device of the character described in combination with a pantograph, said device comprising a base, an auxiliary carriage, a table top, said base having ways disposed within its upper face, said table top having the ways arranged in angular relation to said ways within its bottom face, said auxiliary carriage disposed between said table top and base, slidable means on the top of said auxiliary carriage engaging the ways on said table top, slidable means on the bottom of said carriage engaging the ways on the top of said base, said pantograph attached at one of its depending ends to said base and at the other depending end to said table top, shafts mounted on bearings attached to the top face of said auxiliary carriage, said shafts being provided with gears, gear racks disposed on the bottom of said table top, said gear racks registering with and engaging said gears, said shafts disposed at right angle to the ways on the bottom of said table top, the engagement of said gears with said gear racks controlling and equalizing the movement of said table top by means of said pantograph.

3. A device of the character described comprising in combination with a pantograph, a base, an auxiliary carriage, a table top, means for guiding said carriage on said base in one direction and guiding said tabletop on said auxiliary carriage in a transverse direction, shafts mounted in bearings supported by the upper face of said carriage, shafts mounted in bearings supported by the upper face of said base, all of said shafts provided with gears, gear racks disposed on the bottom of said table and bottom of said auxiliary carriage, said gear racks arranged for contact with and in direct alignment with said gears, for controlling and equalizing the movement of said table top on said auxiliary carriage by means of said pantograph and the movement of said auxiliary carriage on said base.

CHARLES O. ROTHWEILER.

REFERENCES CITED

The following references are of record in the file of this patent:

UNITED STATES PATENTS

| Number | Name | Date |
| --- | --- | --- |
| 621,660 | Halle | Mar. 21, 1899 |
| 898,141 | Sawyer | Sept. 8, 1908 |
| 972,033 | Steers | Oct. 4, 1910 |
| 1,017,461 | Pourtauborde | Feb. 13, 1912 |
| 1,283,489 | Foothorap | Nov. 5, 1918 |
| 2,185,011 | Anderson | Dec. 26, 1939 |
| 2,253,095 | Rothweiler | Aug. 19, 1941 |